(12) United States Patent
Jeong et al.

(10) Patent No.: US 11,643,158 B2
(45) Date of Patent: May 9, 2023

(54) VEHICLE BODY ASSEMBLY SYSTEM

(71) Applicants: HYUNDAI MOTOR COMPANY, Seoul (KR); KIA MOTORS CORPORATION, Seoul (KR)

(72) Inventors: Yongcheol Jeong, Ulsan (KR); Sekyu Kang, Ulsan (KR); Eun Sik Yoon, Ulsan (KR); Seon Woo Kweon, Ulsan (KR); Haejung Kang, Busan (KR); Suwhan Kim, Ulsan (KR); Jung Hoo Lim, Busan (KR); Keonyong Kim, Busan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/140,644

(22) Filed: Jan. 4, 2021

(65) Prior Publication Data

US 2022/0024533 A1 Jan. 27, 2022

(30) Foreign Application Priority Data

Jul. 24, 2020 (KR) .................. 10-2020-0092054

(51) Int. Cl.
*B62D 65/02* (2006.01)
*B23K 37/04* (2006.01)
*B23K 101/00* (2006.01)

(52) U.S. Cl.
CPC ......... *B62D 65/022* (2013.01); *B62D 65/026* (2013.01); *B23K 37/0443* (2013.01); *B23K 2101/006* (2018.08); *B23P 2700/50* (2013.01); *B60Y 2304/07* (2013.01); *B60Y 2410/124* (2013.01)

(58) Field of Classification Search
CPC .... B23P 19/04; B23P 2700/50; B62D 65/026; B62D 65/024; B62D 65/06; B23K 37/0443
See application file for complete search history.

(56) References Cited

U.S. PATENT DOCUMENTS

2012/0137490 A1* 6/2012 Kweon ................ B23K 37/047
29/428

FOREIGN PATENT DOCUMENTS

| JP | 2015-027838 A | 2/2015 |
| KR | 10-0897267 B1 | 5/2009 |
| KR | 10-1806963 B1 | 12/2017 |

* cited by examiner

*Primary Examiner* — Christopher J Besler
(74) *Attorney, Agent, or Firm* — McDonnell Boehnen Hulbert & Berghoff LLP

(57) ABSTRACT

A vehicle body assembly system each forming a pre-buck section and a main-buck section set along a transport path of the floor assembly according to an exemplary embodiment of the present disclosure includes a pre-buck unit configured in the pre-buck section to regulate the seal side and the front and rear sides of side assemblies that are different for each vehicle type, and to assemble the side assembly and the floor assembly, and a main-buck unit configured in the main-buck section to regulates the roof portion and the quarter portion of the side assembly assembled to the floor assembly in the pre-buck section, assemble the roof portion, cowl, roof rail and package tray and assemble the quarter portion and the floor assembly.

5 Claims, 12 Drawing Sheets

VEHICLE BODY ASSEMBLY SYSTEM

CROSS REFERENCE TO RELATED APPLICATIONS

This application claims priority to and the benefit of Korean Patent Application No. 10-2020-0092054 filed in the Korean Intellectual Property Office on Jul. 24, 2020, the entire contents of which are incorporated herein by reference.

BACKGROUND (a) Field

The present disclosure relates to a vehicle body assembly system. More particularly, the present disclosure relates to a vehicle body assembly system capable of assembling vehicle body of multiple vehicle types in a vehicle body assembly line.

(b) Description of the Related Art

In general, the vehicle body is made in the form of a white body (B.I.W) by assembling various product panels produced in the vehicle body sub-process.

The vehicle body includes a floor panel that supports driving units such as an engine and vehicle axle and seats etc., both side panels forming the left and right sides of the vehicle skeleton, a roof panel forming an upper surface of the vehicle skeleton, and components such as a number of cowl panels, a roof rail, a package tray, and a back panel. The assembly of these vehicle body components is done in a process called the main-buck (also known as the body build-up process in the industry).

In the main-buck process, the back panel is bonded to the floor panel through the vehicle body assembly system, and then side panels, cowl panels, roof rails, and package trays are welded to assemble them.

For example, the body assembly system regulates side panels through side gates, sets the side panels to the floor panel, sets cowl panels, roof rails, and package trays on the side panels, and uses a welding robot to weld the joints of these components.

A vehicle body assembly system according to the prior art is provided with a rotation index (commonly referred to as a "four-sided rotating body" in the industry) in which side gates for each vehicle type are respectively installed on four surfaces. The four-sided rotation index rotates in a state where the side panels for each vehicle type are regulated through each side gate, and the side panels of the vehicle type can be positioned on both sides of the floor panel.

Therefore, in the prior art, with the correlated components (e.g., cowl panel, roof rail and package tray) positioned on the upper part of the side panel regulated by the side gate of the four-sided rotation index, the upper part of the side panel and the related components, and the lower part of the side panel and the floor panel can be welded using a welding robot.

However, in the prior art, since the entire skeleton of the vehicle body is regulated at one time through the side gates for each vehicle type with a four-sided rotation index, it inevitably leads to a high weight and a huge increase in the entire vehicle body assembly system.

Furthermore, in the prior art, side gates for each vehicle type are installed on each side of the four-sided rotation index, it is impossible to assemble a car body of more than 5 car types, and to assemble a car body of all car types, it is necessary to additionally install a large, heavy existing facility.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a vehicle body assembly system capable of assembling vehicle body of multiple vehicle types by separating the vehicle body assembly process into two processes, unlike forming the skeleton of the vehicle body in a single process.

A vehicle body assembly system each forming a pre-buck section and a main-buck section set along a transport path of the floor assembly according to an exemplary embodiment of the present disclosure includes a pre-buck unit configured in the pre-buck section to regulate the seal side and the front and rear sides of side assemblies that are different for each vehicle type, and to assemble the side assembly and the floor assembly, and a main-buck unit configured in the main-buck section to regulates the roof portion and the quarter portion of the side assembly assembled to the floor assembly in the pre-buck section, assemble the roof portion, cowl, roof rail and package tray and assemble the quarter portion and the floor assembly.

Further, in the vehicle body assembly system according to an exemplary embodiment of the present disclosure, the pre-buck unit may include a pre-buck side jig mounted on a distal end of the arm of the handling robot and regulating the seal side and the front and rear sides of the side assembly, and a first guide post installed to be reciprocally moved in a vehicle width direction on the pre-buck frames on both sides of the transfer path and coupled to the pre-buck side jig through the handling robot.

Further, in the vehicle body assembly system according to an exemplary embodiment of the present disclosure, the main-buck unit may include a main-buck side jig mounted on the front end of the arm of the handling robot and regulating a roof portion of the side assembly, a second guide post installed in the main-buck frame on both sides of the transfer path so as to be reciprocally moved along the vehicle width direction, and coupled to the main-buck side jig through the handling robot, and a quarter portion side gate mounted on a mounting frame installed to be reciprocally movable along a vehicle width direction in the main-buck frame separately from the second guide post, and regulating a quarter portion of the side assembly.

Further, in the vehicle body assembly system according to an exemplary embodiment of the present disclosure, in the pre-buck section, a width of the floor assembly along the vehicle width direction is measured, and the first guide post may be moved to a set position according to the measured value.

Further, in the vehicle body assembly system according to an exemplary embodiment of the present disclosure, in the main-buck section, a distance between the side assemblies positioned on both sides of the floor assembly is measured, and the second guide post and the mounting frame may be moved to a set position according to the measured value.

Further, a vehicle body assembly system that forms the pre-buck section and the main-buck section set along the transport path of the floor assembly according to an exemplary embodiment of the present disclosure includes a pre-buck side jig mounted on the handling robot in the pre-buck section and regulating the seal side and the front and rear sides of side assemblies that are different for each vehicle type, a first moving member installed to be reciprocally moved in the vehicle width direction in the pre-buck frames on both sides of the transfer path in the pre-buck section, a pair of first guide posts installed on the first moving member and coupled with the pre-buck side jig through the handling robot, a main-buck side jig mounted on the handling robot in the main-buck section and regulating a roof portion of the side assembly assembled to the floor assembly in the pre-buck section, a second moving member installed in the main-buck frame on both sides of the transfer path to reciprocate along the vehicle width direction in the main-buck section, a pair of second guide posts installed on the second moving member and coupled to the main-buck side jig through the handling robot, a third moving member installed in the main-buck frame to reciprocate along the vehicle width direction separately from the second moving member, and a quarter portion side gate mounted on the third moving member through a mounting frame and regulating a quarter portion of the side assembly.

Further, the vehicle body assembly system according to an exemplary embodiment of the present disclosure may further a first sensor installed in the pre-buck section and measuring a width of the floor assembly along a vehicle width direction, and a second sensor installed in the main-buck section and measuring a distance between the side assemblies positioned on both sides of the floor assembly.

Further, in the vehicle body assembly system according to an exemplary embodiment of the present disclosure, the pre-buck side jig may be installed on both front and rear sides of the jig frame along the vehicle body transport direction, and include first post coupling portions respectively coupled to the first guide posts.

Further, in the vehicle body assembly system according to an exemplary embodiment of the present disclosure, the main-buck side jig may be installed on both front and rear sides of the jig frame along the vehicle body transport direction, and include second post coupling portions respectively coupled to the second guide posts.

Further, in the vehicle body assembly system according to an exemplary embodiment of the present disclosure, the first guide post may include first jig coupling portions respectively coupled to the first post coupling portions of the pre-buck side jig.

Further, in the vehicle body assembly system according to an exemplary embodiment of the present disclosure, the second guide post may include second jig coupling portions respectively coupled to the second post coupling portions of the main-buck side jig.

Further, in the vehicle body assembly system according to an exemplary embodiment of the present disclosure, the first and second post coupling portions may include a coupling block provided on both front and rear sides of the jig frame, and a coupling pin and a guide roller provided on each of the coupling blocks.

Further, in the vehicle body assembly system according to an exemplary embodiment of the present disclosure, the first and second jig coupling portions may include a coupling housing having a pin coupling hole for pin coupling with a coupling pin of the coupling block, and a jig clamp installed on the first and second guide posts and clamping the coupling block coupled to the coupling housing.

Further, in the vehicle body assembly system according to an exemplary embodiment of the present disclosure, the main-buck side jig may include a first coupling rod fixedly installed along a vehicle width direction to a jig frame positioned at one side of the transport path in the main-buck section and having a coupling protrusion at a free end, and a second coupling rod fixedly installed along the vehicle width direction in a jig frame positioned on the other side of the transfer path in the main-buck section, and forming a coupling groove that engages the coupling protrusion of the first coupling rod at a free end.

Further, in the vehicle body assembly system according to an exemplary embodiment of the present disclosure, the quarter portion side gate may include a gate frame provided so as to be mountable to the front end of the arm of the handling robot through the robot coupling portion and fixedly installed on the mounting frame, and at least one fastening portion provided in the gate frame.

Further, in the vehicle body assembly system according to an exemplary embodiment of the present disclosure, the mounting frame may include a docking coupling portion coupled to the lower end of the gate frame, and a mounting portion mutually fastened with the fastening portion of the quarter portion side gate.

Further, a vehicle body assembly system that forms the pre-buck section and the main-buck section set along the transport path of the floor assembly according to an exemplary embodiment of the present disclosure includes a pre-buck side jig mounted on the handling robot in the pre-buck section and regulating the seal side and the front and rear sides of side assemblies that are different for each vehicle type, a pair of first guide posts installed on a first moving member reciprocating in the vehicle width direction to the pre-buck frames on both sides of the transfer path in the pre-buck section, and coupled with the pre-buck side jig through the handling robot, a main-buck side jig mounted on the handling robot in the main-buck section and regulating a roof portion of the side assembly assembled to the floor assembly in the pre-buck section, a pair of second guide posts installed on second moving members reciprocating along the vehicle width direction in the main-buck frames on both sides of the transfer path in the main-buck section, and coupled to the main-buck side jig through the handling robot, a quarter portion side gate mounted on the main-buck frame separately from the second moving member through a mounting frame to a third moving member reciprocating along a vehicle width direction, and regulating a quarter portion of the side assembly, and a position correction unit installed in the pre-buck frame, the main-buck frame, and the first, second, and third moving members so as to be in mutually stopping contact, and correcting a stopping position of the first, second, and third moving members with respect to the pre-buck frame and the main-buck frame.

Further, in the vehicle body assembly system according to an exemplary embodiment of the present disclosure, the position correction unit may include a fixing stopper having a inclined surface inclined toward one side based on a vehicle body transport direction, and fixedly installed on the first, second, and third moving members, and a movable stopper that has a inclined surface inclined toward the other side, is provided to be in contact with the fixing stopper, and is installed on the pre-buck frame and the main-buck frame to be moved back and forth along the vehicle body transport direction by a driving source.

Further, in the vehicle body assembly system according to an exemplary embodiment of the present disclosure, the driving source may include a linear module having a movable block linearly reciprocating along the vehicle body transport direction through a linear guide and installed in the pre-buck frame and the main-buck frame.

Further, in the vehicle body assembly system according to an exemplary embodiment of the present disclosure, the first, second, and third moving members may be respectively connected to operating cylinders provided in the pre-buck frame and the main-buck frame.

Further, the vehicle body assembly system according to an exemplary embodiment of the present disclosure may further include a first storage unit installed in the pre-buck section and storing the pre-buck side jigs different for each vehicle type, a second storage unit installed in the main-buck section and storing the main-buck side jigs different for each vehicle type, and a third storage unit installed in the main-buck section and storing side gates of the quarter unit.

Further, the vehicle body assembly system according to an exemplary embodiment of the present disclosure may further include first welding robots installed in the pre-buck section and welding the side assembly and the floor assembly, and second welding robots installed in the main-buck section, welding the side assembly and the floor assembly, and welding the side assembly and the cowl, the roof rail, and the package tray.

Exemplary embodiments of the present disclosure enable flexible production of multiple vehicle types, reduce equipment preparation time, achieve weight reduction and simplification of the entire equipment, and reduce investment costs at the initial stage and when adding vehicle types.

In addition, effects that can be obtained or predicted by the exemplary embodiments of the present disclosure will be disclosed directly or implicitly in the detailed description of the exemplary embodiments of the present disclosure. That is, various effects predicted according to an embodiment of the present disclosure will be disclosed within a detailed description to be described later.

BRIEF DESCRIPTION OF THE FIGURES

The drawings are provided for reference in describing exemplary embodiments of the present disclosure and the spirit of the present disclosure should not be construed only by the accompanying drawings.

<Description of symbols>

Figure 1:
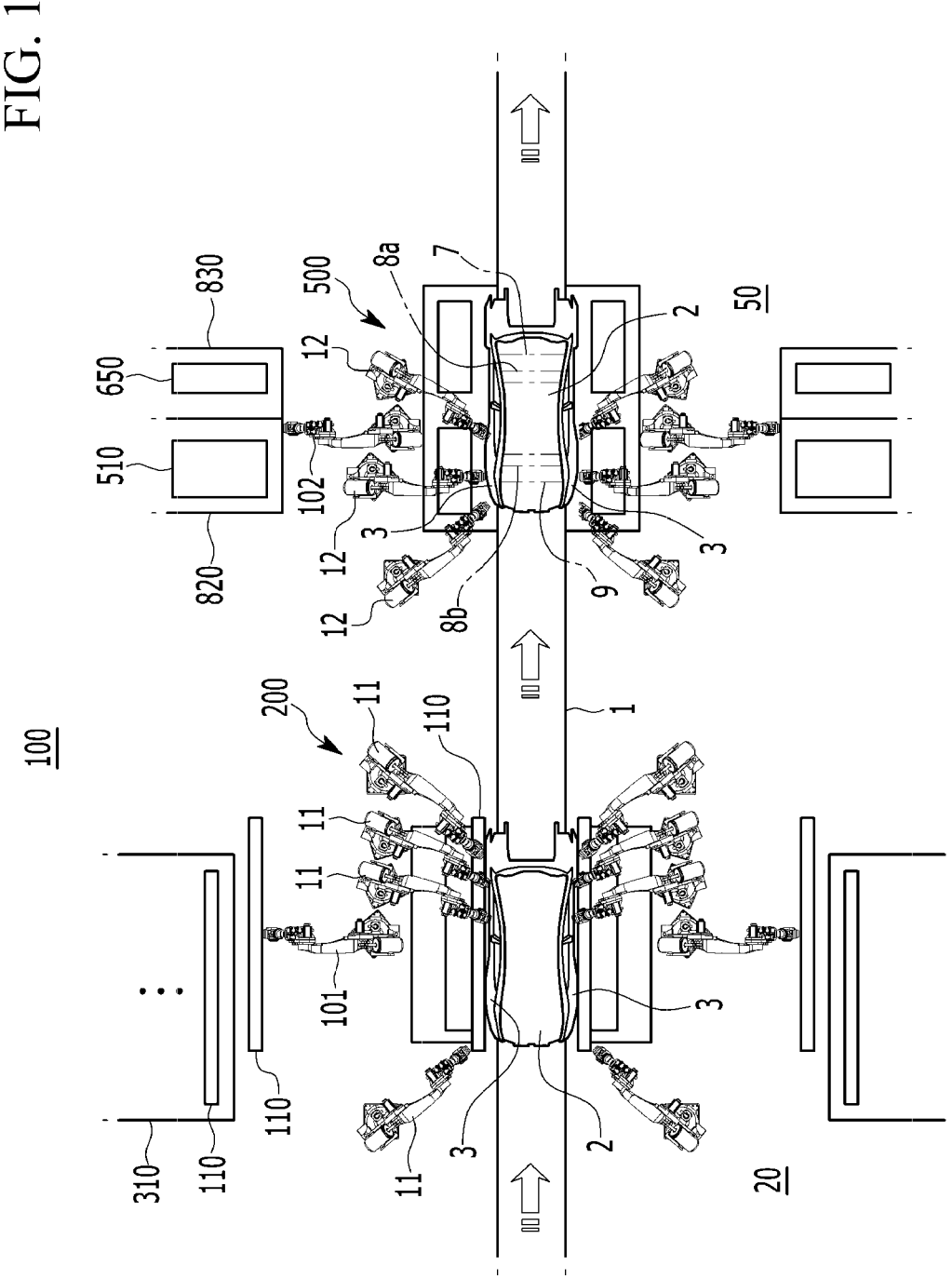
FIGS. 1 and 2 are diagrams schematically showing a vehicle body assembly system according to an exemplary embodiment of the present disclosure.

| | |
|---|---|
| 1: carriage line | 2: floor assembly |
| 3: side assembly | 4a: seal side |
| 4b: front side | 4c: rear side |
| 4d: roof portion | 4e: quarter portion |
| 7: cowl | 8a: front roof rail |
| 8b: rear roof rail | 9: package tray |
| 10: CRP carriage | 11: first welding robot |
| 12: second welding robot | 20: pre-buck section |
| 21: pre-buck frame | 50: main-buck section |
| 51: main-buck frame | 100: vehicle body assemble system |
| 101: first handling robot | 102: second handling robot |
| 110: pre-buck side jig | 111: first jig frame |
| 112: first robot mount portion | 113: first clamper |
| 121: first post coupling portion | 123: first coupling block |
| 125: first coupling pin | 127: first guide roller |
| 150: first moving member | 151: first driving source |
| 153: first operating cylinder | 170: first guide post |
| 171: first post frame | 173: first jig coupling portion |
| 175: first coupling housing | 177: first jig clamp |
| 179: first pin coupling hole | 200: pre-buck unit |
| 210: first sensor | 230: first position correction unit |
| 231: first fixing stopper | 233: first inclined surface |
| 241: first movable stopper | 243: second inclined surface |
| 245: second driving source | 247: first linear module |
| 251, 751, 771: linear motor | 253, 753, 773: linear guide |
| 255, 755, 775: moving block | 310: first storage unit |
| 500: main-buck unit | 510: main-buck side jig |
| 511: second jig frame | 512: second robot mount portion |
| 513: second clamper | 521: second post coupling portion |
| 523: second coupling block | 525: second coupling pin |
| 527: second guide roller | 531: first coupling rod |
| 532: second coupling rod | 533: coupling protrusion |
| 534: coupling groove | |
| 551: third driving source | 550: second moving member |
| 570: second guide post | 553: second operation cylinder |
| 573: second jig coupling portion | 571: second post frame |
| 577: second jig clamp | 575: second coupling housing |
| 610: third moving member | 579: second pin coupling hole |
| 613: third operating cylinder | 611: fourth driving source |
| 631: docking coupling portion | 630: mounting portion |
| 650: quarter portion side gate | 640: mount frame |
| 652: robot coupling portion | 651: gate frame |
| 655: third clamper | 653: engage portion |
| 730, 750: second position correction unit, third position correction unit | 710: second sensor |
| 731, 751: second fixing stopper, third fixing stopper | |
| 733, 753: third inclined surface, fourth inclined surface | |
| 741, 761: second movable stopper, third movable stopper | |
| 743, 763: fifth inclined surface, sixth inclined surface | |
| 745, 765: fifth driving source, sixth driving source | |
| 747, 767: second linear module, third linear module | |
| 820: second storage unit | 830: third storage unit |

DETAILED DESCRIPTION

Hereinafter, the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clarify a description of the present disclosure, parts not related to the description are omitted, and the same reference numbers are used throughout the drawings to refer to the same or like parts. Furthermore, a description of parts which may be easily understood by those skilled in the art is omitted.

The size and thickness of each of elements shown in the drawings are randomly illustrated for convenience of description and thus the present disclosure is not limited to those shown in the drawings. In the drawings, a thickness is enlarged in order to clearly show several parts and areas.

Furthermore, in the following detailed description, terms denoting the names of elements, such as the first and the second, are provided to distinguish the elements from each other because the elements have the same construction, and the elements are not limited to corresponding order in the following description.

In the entire specification, unless explicitly described to the contrary, the word "comprise" and variations, such as "comprises" or "comprising", will be understood to imply the inclusion of stated elements but not the exclusion of any other elements.

Furthermore, each of terms, such as ' . . . unit", " . . . means', ' . . . part', and ' . . . member' described in the specification, mean a unit of a comprehensive element that performs at least one function or operation.

Figure 2:
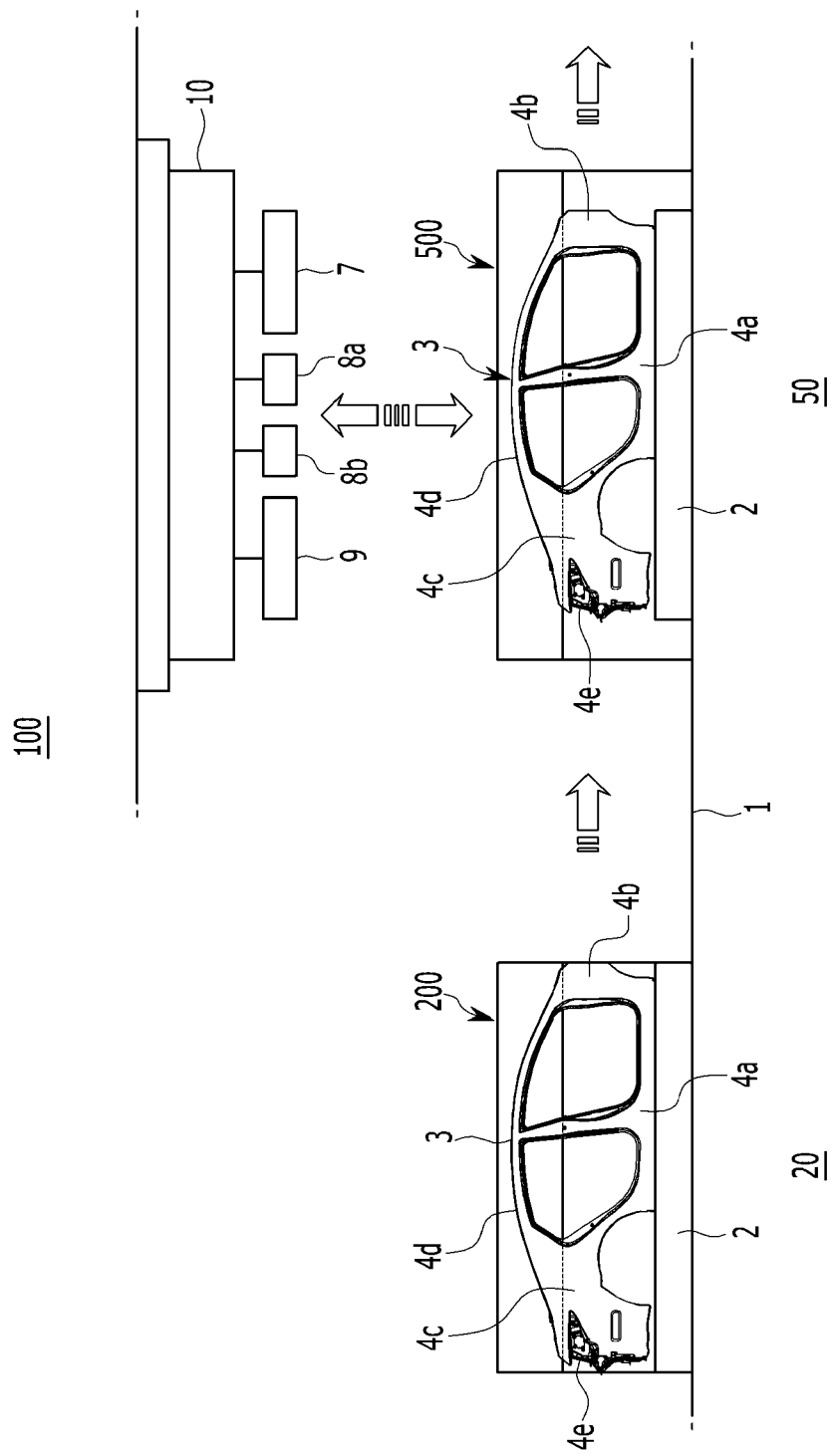

FIGS. 1 and 2 are diagrams schematically showing a vehicle body assembly system according to an exemplary embodiment of the present disclosure.

Figure 3:
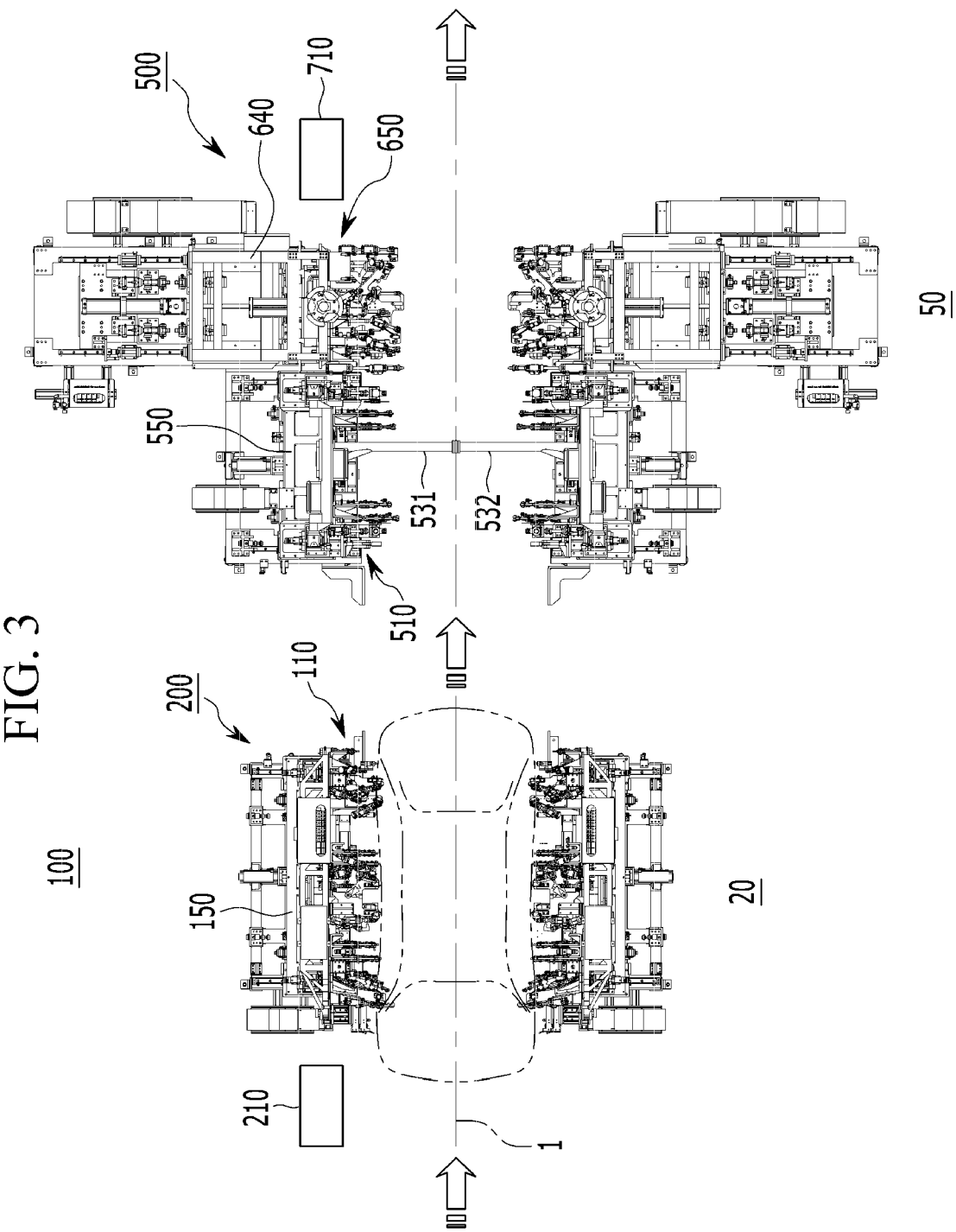
FIG. 3 is a plan view showing a vehicle body assembly system according to an exemplary embodiment of the present disclosure.

Referring to FIG. 1 to FIG. 3, a vehicle body assembly system according to an exemplary embodiment of the present disclosure can be applied to a body assembly line that regulates and welds vehicle body assembly components transported from a sub-assembly line of a body factory with a jig, and completes the skeleton of a body white body (B.I.W).

The body assembly line process includes a step of assembling a floor assembly that becomes the basis of a vehicle body, a step of assembling a side assembly, which is a wall component of a vehicle body, with a floor assembly, and a step of assembling a cowl, roof rail, and package tray to the side assembly.

Here, a process of assembling a side assembly to a floor assembly and assembling a cowl, a roof rail, and a package tray to the side assembly is also referred to as a buck process in the industry.

This buck process is a process of fixing a welding fixture through a jig, swinging, rotating, and shifting the welding fixture, and assembling an under body assembly, a side body assembly, and a roof body assembly.

In the vehicle body assembly system according to an exemplary embodiment of the present disclosure, a robot can be applied as a spot welding facility in the buck process of assembling floor assemblies, left and right side assemblies, cowl, front/rear roof rails and package trays in the body assembly line.

Furthermore, in the vehicle body assembly system 100 according to the embodiment of the present disclosure, based on the floor assembly 2 transported along the transport path set through the carriage line 1, the side assembly 3 may be assembled on both sides of the floor assembly 2. In addition, the vehicle body assembly system 100 may assemble the cowl 7, the front roof rail 8a, the rear roof rail 8b, and the package tray 9 to the side assembly 3. Here, the cowl 7, the front roof rail 8a, the rear roof rail 8b, and the package tray 9 may be defined as CRP components 7, 8a, 8b, and 9.

In an exemplary embodiment of the present disclosure, the conveying direction of the floor assembly 2 is defined as the vehicle body conveying direction (more, the front-rear direction). In the industry, the vehicle body transport direction is called the T direction, the vehicle width direction is called the L direction, and the height direction of the vehicle body is called the H direction.

However, in an exemplary embodiment of the present disclosure, instead of setting the LTH direction as the reference direction as described above, the components are described below by setting the vehicle body transport direction, the vehicle width direction, and the height direction.

Furthermore, the stage in the following may be defined as either end (one/one end or the other/one end), or may be defined as a certain portion including the end (one/one end or the other/one end).

The vehicle body assembly system 100 according to an exemplary embodiment of the present disclosure can assemble multiple vehicle types by separating the vehicle body assembly process into two processes, unlike forming the skeleton of the vehicle body in a single process, and has a structure capable of reducing the weight of the entire facility.

To this end, in the vehicle body assembly system 100 according to the exemplary embodiment of the present disclosure, a pre-buck section 20 and a main-buck section 50 divided along the transfer path of the carriage line 1 are set.

In addition, the vehicle body assembly system 100 according to an exemplary embodiment of the present disclosure basically includes a pre-buck unit 200 configured in the pre-buck section 20 and a main-buck unit 500 configured in the main-buck section 50.

The pre-buck unit 200 and the main-buck unit 500 as described above can be in one frame in each pre-buck section 20 and the main-buck section 50, or can be divided into each frame.

This frame is for supporting the components to be described below, and includes various brackets, blocks, plates, housings, covers, collars, and other accessory elements.

However, since the sub-elements are for installing each of the constituent elements in the frame, the above-described sub-elements are collectively referred to as a frame except for exceptional cases in the exemplary embodiment of the present disclosure.

In an exemplary embodiment of the present disclosure, the pre-buck unit 200 regulates the lower sill side 4a and the front and rear sides 4b and 4c of the side assembly 3, which are different for each vehicle type in the pre-buck section 20. This is for assembling the side assembly 3 to the floor assembly 2.

Further, the pre-buck unit 200 can weld the seal side 4a and the front and rear sides 4b and 4c of the side assembly 3 through the first welding robot 11 installed in the pre-buck section 20.

The configuration of the pre-buck unit 200 is configured on both sides of the transfer path of the carriage line 1 in the pre-buck section 20, and the configuration will be described in more detail below.

In an exemplary embodiment of the present disclosure, the main-buck unit 500 regulates the roof portion 4d and the quarter portion 4e of the side assembly 3 assembled to the floor assembly 2 in the pre-buck section 20, assembles the roof portion 4d and the cowl 7, the front roof rail 8a, the rear roof rail 8b, and the package tray 9, and assembles the quarter portion 4e and the floor assembly 2.

Here, the main-buck unit 500 may assemble the cowl 7, the front roof rail 8a, the rear roof rail 8b, and the package tray 9 as CRP components regulated by the CRP carriage 10 to the side assembly 3.

Furthermore, the main-buck unit 500 can weld the roof portion 4d and the cowl 7 of the side assembly 3, the front roof rail 8a, the rear roof rail 8b, and the package tray 9 through the second welding robot 12 installed in the main-buck section 50, and can weld the quarter portion 4e of the side assembly 3 and the floor assembly 2.

The configuration of the main-buck unit 500 is configured on both sides of the transfer path of the carriage line 1 in the main-buck section 50, and the configuration will be described in more detail below.

Figure 4:
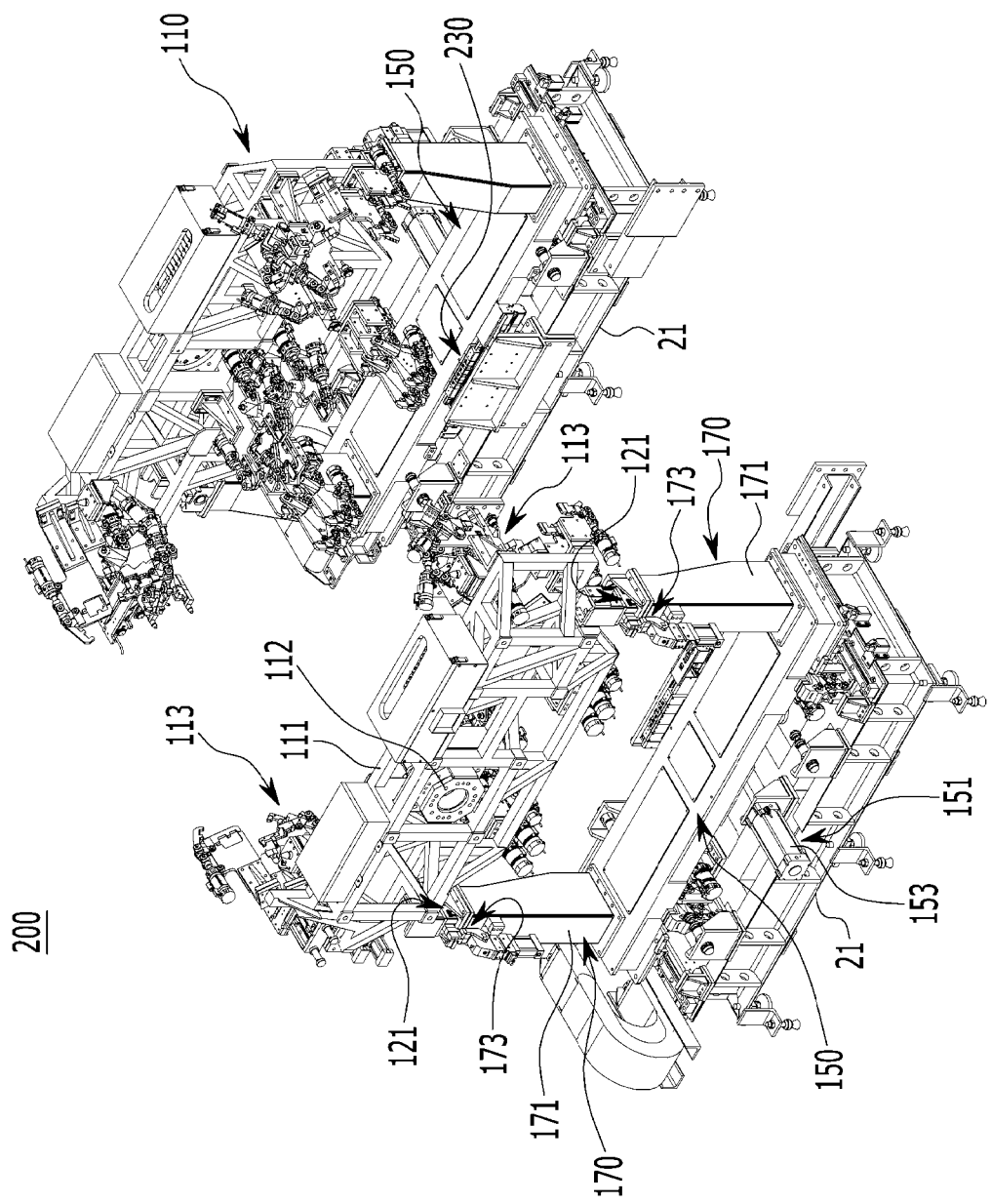
FIG. 4 is a combined perspective view showing a pre-buck unit applied to a vehicle body assembly system according to an exemplary embodiment of the present disclosure.
Figure 5:
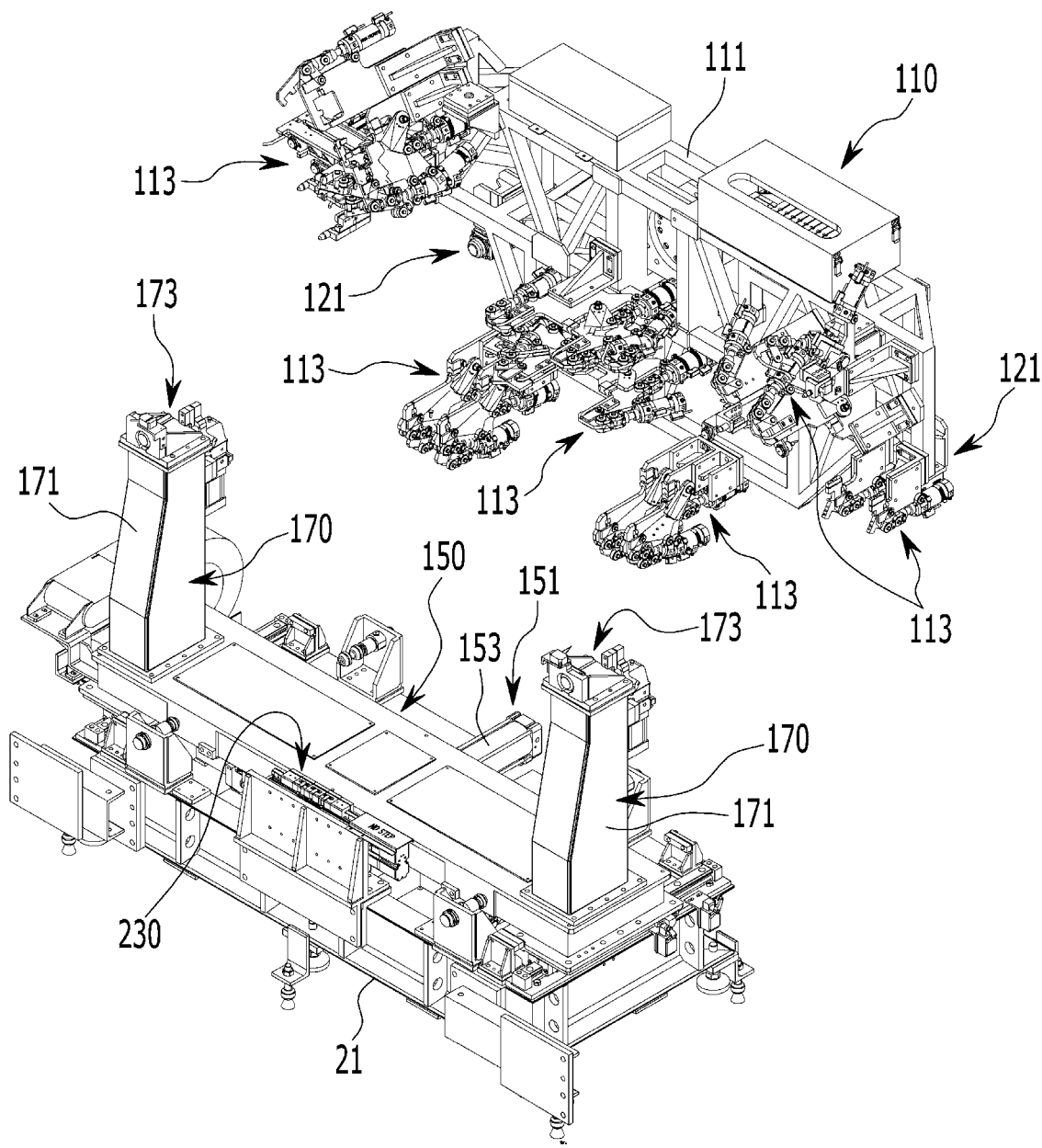
FIG. 5 is a partial exploded perspective view illustrating a pre-buck unit applied to a vehicle body assembly system according to an exemplary embodiment of the present disclosure.

FIG. 4 is a combined perspective view showing a pre-buck unit applied to a vehicle body assembly system according to an exemplary embodiment of the present disclosure, and FIG. 5 is a partial exploded perspective view illustrating a pre-buck unit applied to a vehicle body assembly system according to an exemplary embodiment of the present disclosure.

Referring to FIG. 1 to FIG. 5, the pre-buck unit 200 according to an exemplary embodiment of the present disclosure regulates the lower seal side 4a and the front and rear sides 4b and 4c of the side assembly 3, and includes a structure in which the side assembly 3 can be accurately matched to the set positions on both sides of the floor assembly 2.

Furthermore, the pre-buck unit 200 has a structure capable of minimizing the distribution of the position (assembly) of the side assembly 3 to be matched to both sides of the floor assembly 2. Further, the pre-buck unit 200 may weld the lower seal side 4a and the front and rear sides 4b and 4c of the side assembly 3 to both sides of the floor assembly 2.

To this end, the pre-buck unit 200 according to an exemplary embodiment of the present disclosure includes a pre-buck side jig 110, a first moving member 150, a first guide post 170, a first sensor 210, and a first position correction unit 230.

In an exemplary embodiment of the present disclosure, the pre-buck side jig 110 regulates the seal side 4a and the front and rear sides 4b and 4c of the side assembly 3 to be matched to both sides of the floor assembly 2.

The pre-buck side jig 110 may regulate (clamp) the seal side 4a and the front and rear sides 4b and 4c of the side assembly 3 arranged in a separate alignment jig. The pre-buck side jig 110 may be mounted on the front end of the arm of the first handling robot 101 in the pre-buck section 20.

The pre-buck side jig 110 includes a first jig frame 111, first clampers 113, and a first post coupling portion 121.

The first jig frame 111 is mounted on the arm tip of the first handling robot 101 through the first robot mounting portion 112.

The first clamper 113 clamps the seal side 4a and the front and rear sides 4b and 4c of the side assembly 3 different for each vehicle type, and is installed in plurality on the first jig frame 111. The first clamper 113 is provided as a clamper of a known technology capable of clamping or unclamping through a clamp cylinder. In this case, the first clamper 113 may be installed to reciprocate in a direction set with respect to the first jig frame 111 according to a vehicle type.

In addition, the first post coupling portion 121 couples the first jig frame 111 and the first guide post 170 to be described later, and is provided on both front and rear sides of the first jig frame 111 along the vehicle body transport direction. That is, the pre-buck side jig 110 may be coupled to the first guide post 170 through the first post coupling portion 121.

Figure 6:
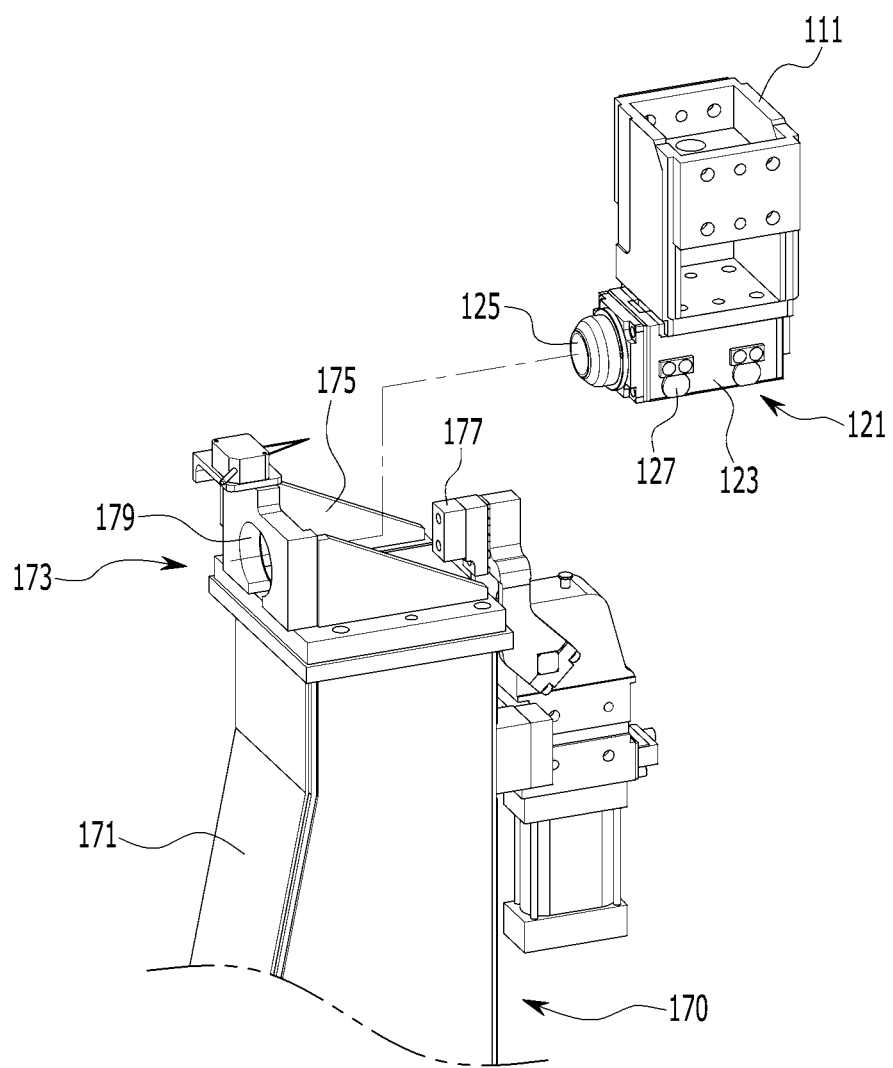
FIG. 6 is a view showing a first post coupling portion and a first jig coupling portion of a pre-buck unit applied to a vehicle body assembly system according to an exemplary embodiment of the present disclosure.

The first post coupling portion 121 includes a first coupling block 123, a first coupling pin 125, and first guide rollers 127, as shown in FIG. 6. The first coupling block 123 is provided on both front and rear sides of the first jig frame 111.

The first coupling pin 125 is provided on the side facing the transport path of the first coupling block 123. In addition, the first guide rollers 127 are rotatably installed on both front and rear sides of the first coupling block 123 along the vehicle body transport direction.

Referring to FIG. 4 and FIG. 5, in an exemplary embodiment of the present disclosure, the first moving member 150 is installed in the pre-buck frame 21 on both sides of the transfer path in the pre-buck section 20, and installed to be reciprocally moved in the vehicle width direction with respect to both sides of the floor assembly 2.

For example, the first moving member 150 is provided in a plate shape, and is installed to be reciprocally moved in the vehicle width direction by the first driving source 151 on the upper surface of the pre-buck frame 21.

Here, the first driving source 151 includes a first actuating cylinder 153 fixedly installed on the pre-buck frame 21 and having an actuating rod actuated forward and backward by pneumatic pressure. The first actuating cylinder 153 is connected to the first moving member 150 through an actuating rod.

Referring to FIG. 4 and FIG. 5, in an exemplary embodiment of the present disclosure, the first guide post 170 is coupled to the pre-buck side jig 110 through the first handling robot 101 and is fixedly installed on the first moving member 150.

The first guide posts 170 are installed as a pair to be fixed to the front and rear sides of the first moving member 150 along the vehicle body transport direction. The first guide post 170 includes a first post frame 171 and a first jig coupling portion 173 provided in the first post frame 171.

The first post frame 171 is installed to be fixed to the first moving member 150 in the vertical direction. The first jig coupling portion 173 is coupled with the first post coupling portion 121 of the pre-buck side jig 110, and is installed on the upper end of the first post frame 171 in correspondence with the first post coupling portion 121.

In the above, the first jig coupling portion 173 includes a first coupling housing 175 and a first jig clamp 177 as shown in FIG. 6. The first coupling housing 175 is fixed to the upper end of the first post frame 171.

The first coupling housing 175 supports the first guide roller 127 of the first post coupling portion 121 and is coupled to the first coupling block 123 of the first post coupling portion 121. The first coupling housing 175 has a first pin coupling hole 179 that is pin-coupled with the first coupling pin 125 of the first coupling block 123.

The first jig clamp 177 connects the first coupling block 123 coupled to the first pin coupling hole 179 of the first coupling housing 175 through the first coupling pin 125 to the first coupling housing 175.

The first jig clamp 177 is fixedly installed on the first post frame 171. The first jig clamp 177 is provided as a clamper of a known technology for clamping or unclamping the first coupling block 123 through a clamp cylinder.

Referring to FIG. 3, in an exemplary embodiment of the present disclosure, the width along the vehicle width direction of the floor assembly 2 is measured in the pre-buck section 20, and according to the measured value, the first guide post 170 may be moved to a set position along the vehicle width direction through the first moving member 150.

For this, in an exemplary embodiment of the present disclosure, the first sensor 210 installed in the pre-buck section 20 is included. The first sensor 210 may include a known technology vision sensor. The first sensor 210 measures the width of the floor assembly 2 along the vehicle width direction and outputs the measured value to a controller (not shown in the drawing).

Referring to FIG. 3 to FIG. 5, the first position correction unit 230 according to an exemplary embodiment of the present disclosure can correct the position of the first moving member 150 in the vehicle width direction with respect to the pre-buck frame 21 according to the measured value of the first sensor 210.

Figure 7:
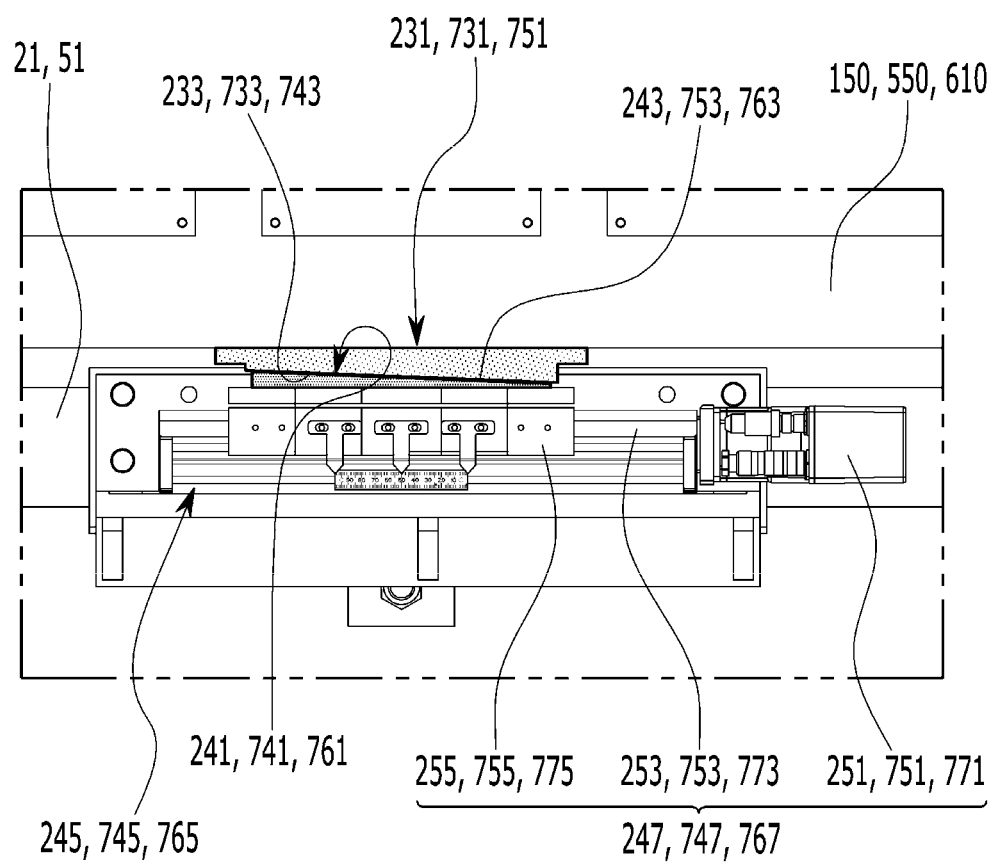
FIG. 7 is a diagram illustrating a position correction unit of a pre-buck unit and a main-buck unit applied to a vehicle body assembly system according to an exemplary embodiment of the present disclosure.

The first position correction unit 230 is installed to be in stopping contact with the pre-buck frame 21 and the first moving member 150. As shown in FIG. 7, the first position correction unit 230 includes a first fixed stopper 231 and a first movable stopper 241.

The first fixing stopper 231 is fixed to the first moving member 150. The first fixing stopper 231 is provided in a plate shape. The first fixed stopper 231 has a first inclined surface 233 inclined toward one side with respect to the vehicle body transport direction.

The first movable stopper 241 is installed in the pre-buck frame 21 to be moved back and forth along the vehicle body transport direction in correspondence with the first fixed stopper 231. The first movable stopper 241 has a plate shape and is provided to be in surface contact with the first fixed stopper 231. The first movable stopper 241 is formed to be inclined on the other side with respect to the vehicle body transport direction, and has a second gradient surface 243 that is capable of surface contact with the first gradient surface 233 of the first fixed stopper 231.

In the above, the first movable stopper 241 moves back and forth along the vehicle body transport direction by the second driving source 245. The second driving source 245 includes a first linear module 247 installed in the pre-buck frame 21.

The first linear module 247 includes a linear motor 251 and a moving block 255 that linearly reciprocates along a vehicle body transport direction through a linear guide 253 by driving the linear motor 251. Here, the first movable stopper 241 is fixedly installed on the moving block 255.

Meanwhile, referring to FIG. 1 and FIG. 2, the pre-buck unit 200 according to an exemplary embodiment of the present disclosure as described above includes the first welding robots 11 and the first storage unit 310 as mentioned above.

The first welding robots 11 are installed in the pre-buck section 20, and the lower seal side 4a of the side assembly 3 and the front and rear sides 4b and 4c are welded to both sides of the floor assembly 2.

In addition, the first storage unit 310 is installed in the pre-buck section 20, and may store different pre-buck side jigs 110 for each vehicle type. The pre-buck side jigs 110 stored in the first storage unit 310 may be pulled out by the first handling robot 101.

Figure 8:
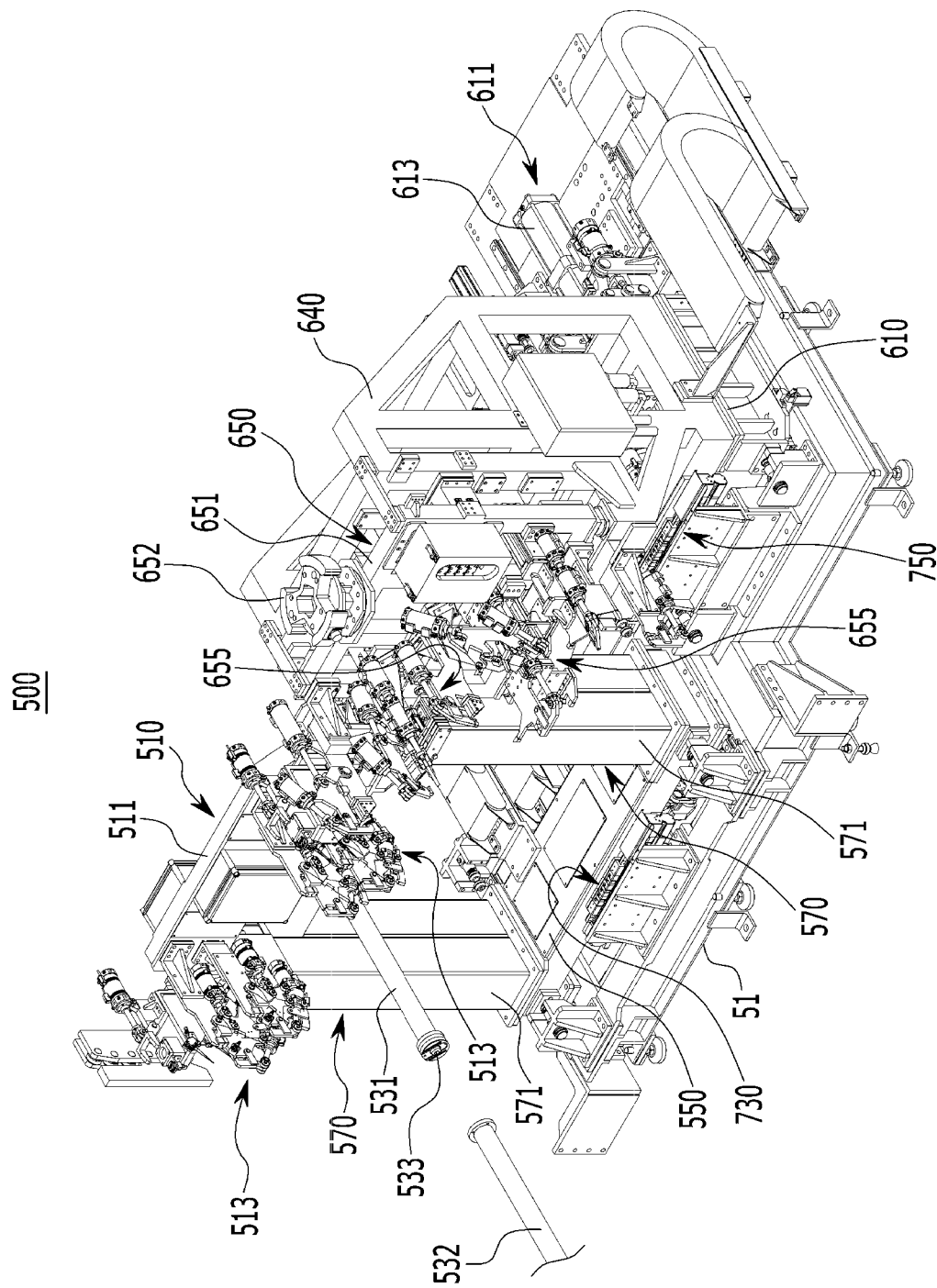
FIGS. 8 and 9 are perspective views illustrating a main-buck unit applied to a vehicle body assembly system according to an exemplary embodiment of the present disclosure.
Figure 9:
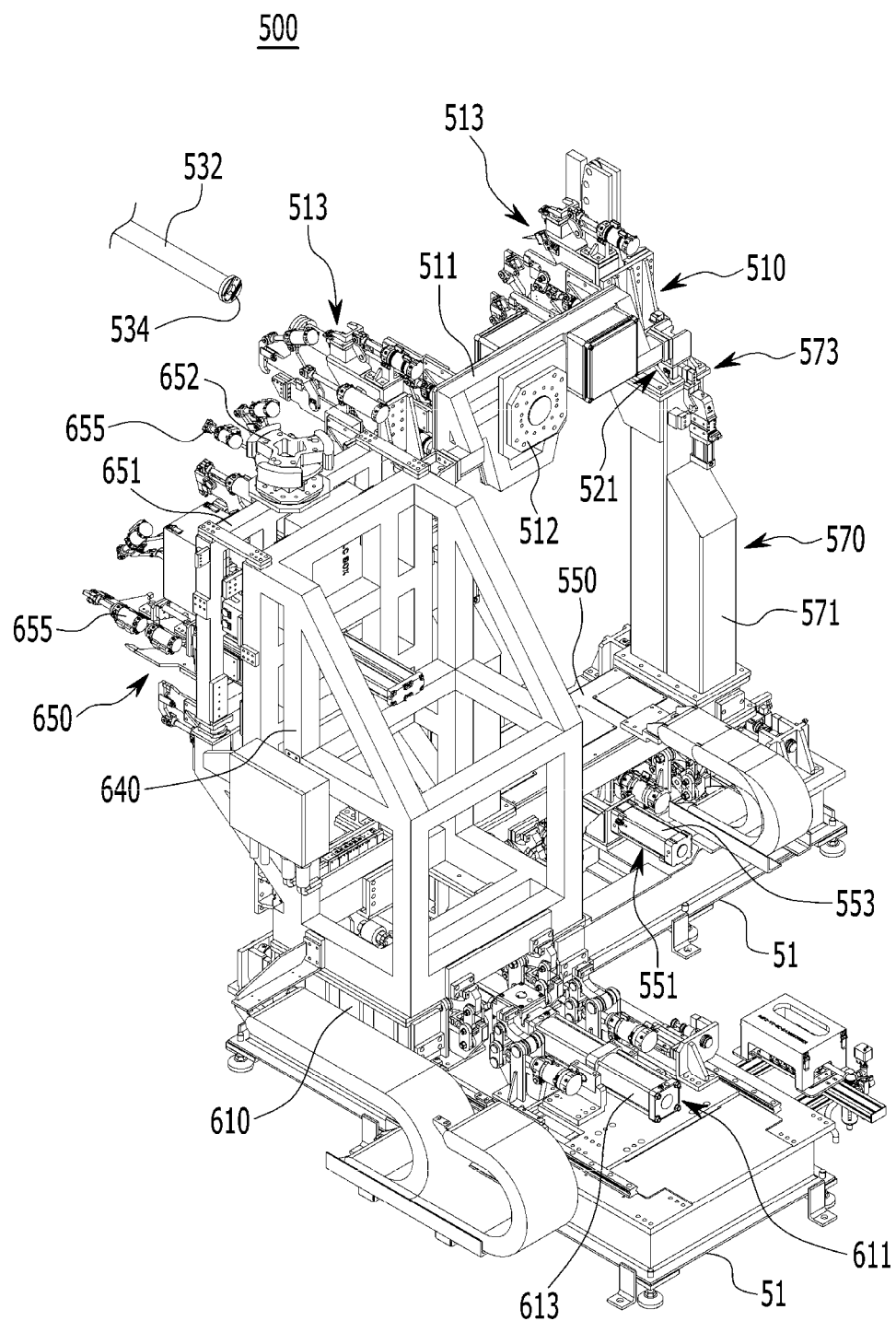
Figure 10:
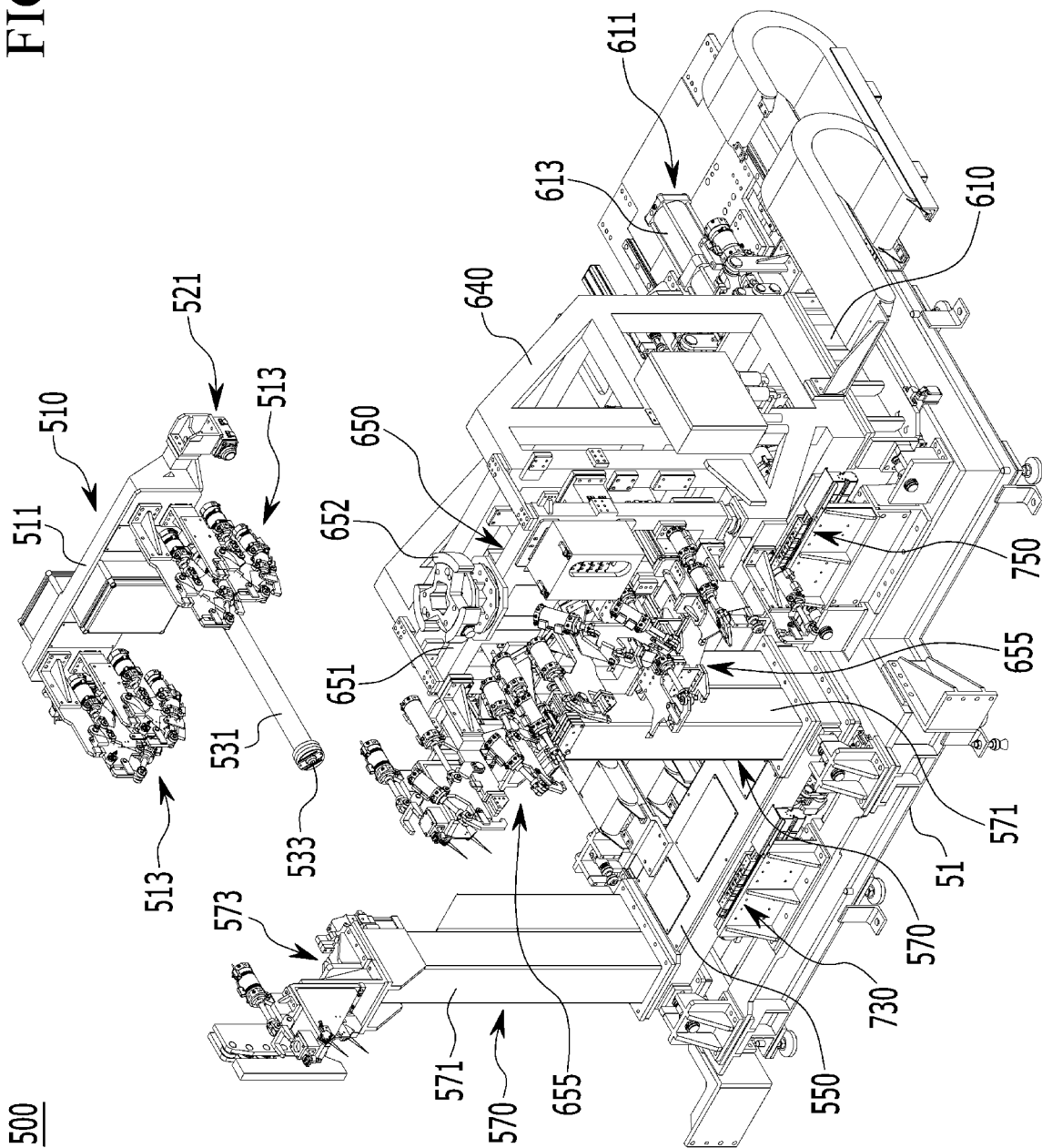
FIG. 10 is a partial exploded perspective view illustrating a main-buck unit applied to a vehicle body assembly system according to an exemplary embodiment of the present disclosure.

FIGS. 8 and 9 are perspective views illustrating a main-buck unit applied to a vehicle body assembly system according to an exemplary embodiment of the present disclosure, and FIG. 10 is a partial exploded perspective view illustrating a main-buck unit applied to a vehicle body assembly system according to an exemplary embodiment of the present disclosure.

Referring to FIG. 8 to FIG. 10 with FIG. 1 to FIG. 3, the main-buck unit 500 according to an exemplary embodiment of the present disclosure includes a structure capable of regulating the roof portion 4d and the quarter portion 4e of the side assembly 3 assembled to the floor assembly 2 by the pre-buck unit 200 in the pre-buck section 20.

In addition, the main-buck unit 500 includes a structure that can accurately match the cowl 7, the front roof rail 8a, the rear roof rail 8b, and the package tray 9 as CRP components regulated by the RP truck 10 to the set position of the side assembly 3.

Further, the main-buck unit 500 has a structure capable of minimizing the distribution of the position (assembly) of the side assembly 3 to be matched with the CP component.

Furthermore, the main-buck unit 500 can weld the roof portion of the side assembly 3, cowl 7, front roof rail 8a, rear roof rail 8b, and package tray 9, and can weld the quarter portion 4e of the side assembly 3 and the floor assembly 2.

For this, the main-buck unit 500 according to an exemplary embodiment of the present disclosure includes a main-buck side jig 510, a second moving member 550, a second guide post 570, a third moving member 610, a mounting frame 640, and a quarter portion side gate 650, a second sensor 710, and second and third position correction units 730 and 750.

In an exemplary embodiment of the present disclosure, the main-buck side jig 510 regulates the roof portions 4d on both sides of the side assembly 3 assembled on the floor assembly 2 in the pre-buck section 20.

The main-buck side jig 510 may be mounted on the arm tip of the second handling robot 102 in the main-buck section 50. The main-buck side jig 510 includes a second jig frame 511, second clampers 513, a second post coupling portion 521, a first coupling rod 531, and a second coupling rod 532.

The second jig frame 511 is mounted on the arm tip of the second handling robot 102 through the second robot mounting portion 512.

The second clampers 513 clamp the roof portion 4d of the side assembly 3 that is different for each vehicle type, and are installed in a plurality of the second jig frame 511. The second clamper 513 is provided as a clamper of a known technology capable of clamping or unclamping the roof portion 4d through a clamp cylinder. At this time, the second clamper 513 may be installed to reciprocate in a direction set with respect to the second jig frame 511 according to a vehicle type.

The second post coupling portions 521 are for coupling the second jig frame 511 and the second guide post 570 to be described later, and are installed on both front and rear sides of the second jig frame 511 along the vehicle body transport direction. That is, the main-buck side jig 510 may be coupled to the second guide post 570 through the second post coupling portion 521.

Figure 11:
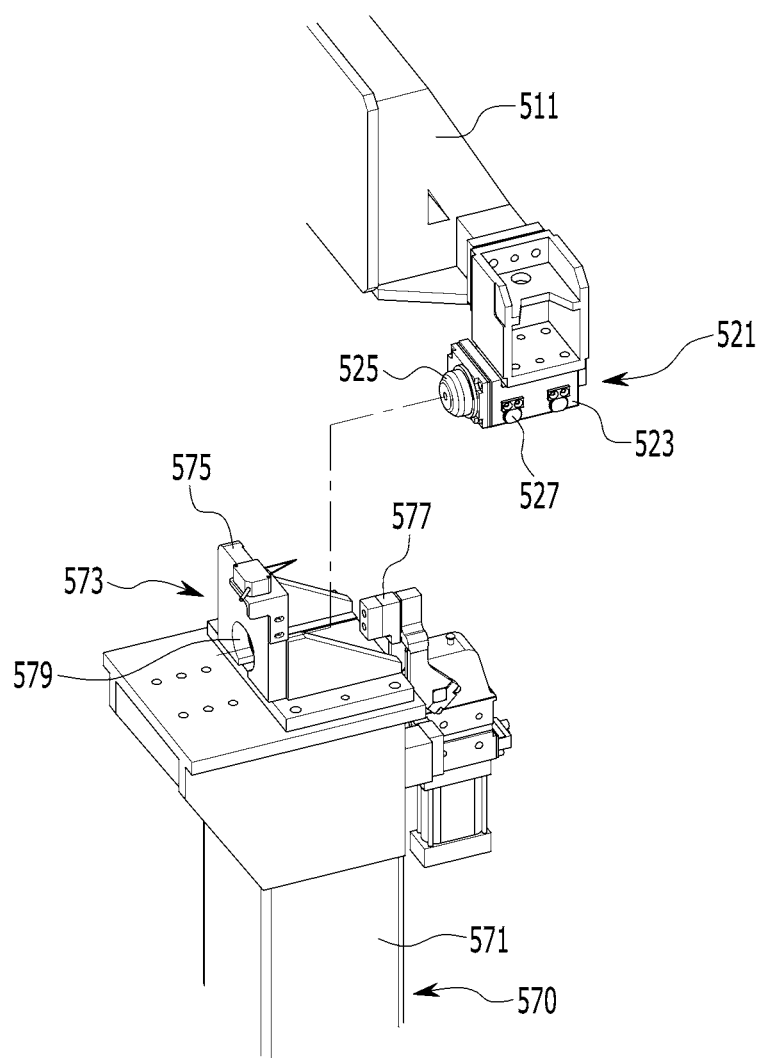
FIG. 11 is a diagram illustrating a second post coupling portion and a second jig coupling portion of a main-buck unit applied to a vehicle body assembly system according to an exemplary embodiment of the present disclosure.

The second post coupling portion 521 includes a second coupling block 523, a second coupling pin 525, and second guide rollers 527, as shown in FIG. 11. The second coupling blocks 523 are provided on both front and rear sides of the second jig frame 511.

The second coupling pin 525 is provided on the side of the second coupling block 523 facing the transport path. In addition, the second guide rollers 527 are rotatably installed on both front and rear sides of the second coupling block 523 along the vehicle body transport direction.

Referring to FIG. 8 to FIG. 10, the first coupling rod 531 and the second coupling rod 532 maintain the absolute width (width in the vehicle width direction) between the two side assemblies 3 regulated by the second clampers 513, and this is to minimize the dispersion between the both side assembly 3.

The first coupling rod 531 is fixedly installed along the vehicle width direction in the second jig frame 511 positioned on one side of the transport path in the main-buck section 50. The first coupling rod 531 has a coupling protrusion 533 at a free end.

The second coupling rod 532 is fixedly installed in the second jig frame 511 located on the other side of the transport path in the main-buck section 50 along the vehicle width direction. The second coupling rod 532 has a coupling groove 534 coupled to the coupling protrusion 533 of the first coupling rod 531 at a free end.

Referring to FIG. 8 to FIG. 10, in an exemplary embodiment of the present disclosure, the second moving members 550 are respectively installed on the main-buck frames 51 on both sides of the transfer path in the main-buck section 50, and is installed to be reciprocally moved in the vehicle width direction with respect to both side assemblies 3 of the floor assembly 2.

For example, the second moving member 550 is provided in a plate shape, and is installed to be reciprocally moved in the vehicle width direction by a third driving source 551 on the upper surface of the main-buck frame 51.

Here, the third driving source 551 includes a second actuating cylinder 553 fixedly installed on the main-buck frame 51 and having an actuating rod actuated forward and backward by pneumatic pressure. The second actuating cylinder 553 is connected to the second moving member 550 through an actuating rod.

Referring to FIG. 8 to FIG. 10, in an exemplary embodiment of the present disclosure, the second guide post 570 is coupled to the main-buck side jig 510 through the second handling robot 102 and is fixedly installed on the second moving member 550.

The second guide posts 570 are installed as a pair to be fixed to each of the front and rear sides of the second moving member 550 along the vehicle body transport direction. The second guide posts 570 each include a second post frame 571 and a second jig coupling portion 573 provided in the second post frame 571.

The second post frame 571 is installed to be fixed to the second moving member 550 in the vertical direction. The second jig coupling portion 573 is coupled with the second post coupling portion 521 of the main-buck side jig 510, and is installed on the upper end of the second post frame 571 corresponding to the second post coupling portion 521.

In the above, the second jig coupling portion 573 includes a second coupling housing 575 and a second jig clamp 577 as shown in FIG. 11. The second coupling housing 575 is fixed to the upper end of the second post frame 571.

The second coupling housing 575 supports the second guide roller 527 of the second post coupling portion 521 and is coupled to the second coupling block 523 of the second post coupling portion 521. The second coupling housing 575 has a second pin coupling hole 579 that is pin-coupled with the second coupling pin 525 of the second coupling block 523.

The second jig clamp 577 attaches the second coupling block 523 coupled to the second pin coupling hole 579 of the second coupling housing 575 through a second coupling pin 525 to a second coupling housing 575.

The second jig clamp 577 is fixedly installed on the upper end of the second post frame 571. The second jig clamp 577 is provided as a clamper of a known technology for clamping or unclamping the second coupling block 523 through a clamp cylinder.

Referring to FIG. 8 to FIG. 10, in an exemplary embodiment of the present disclosure, the third moving member 610 is installed on the main-buck frame 51 separately from the second moving member 550 to reciprocate along the vehicle width direction.

For example, the third moving member 610 is provided in a plate shape, and is installed so as to reciprocate in the vehicle width direction by the fourth driving source 611 on the upper surface of the main-buck frame 51.

Here, the fourth driving source 611 includes a third operating cylinder 613 fixedly installed to the main-buck frame 51 and has an operating rod that operates backward and forward by pneumatic pressure. The third actuating cylinder 613 is connected to the third moving member 610 through an actuating rod.

In an exemplary embodiment of the present disclosure, the mounting frame 640 is for mounting the quarter portion side gate 650, which will be further described later, and is provided in a frame structure in which horizontal frames and vertical frames are interconnected, and is fixedly installed on the third moving member 610.

Figure 12:
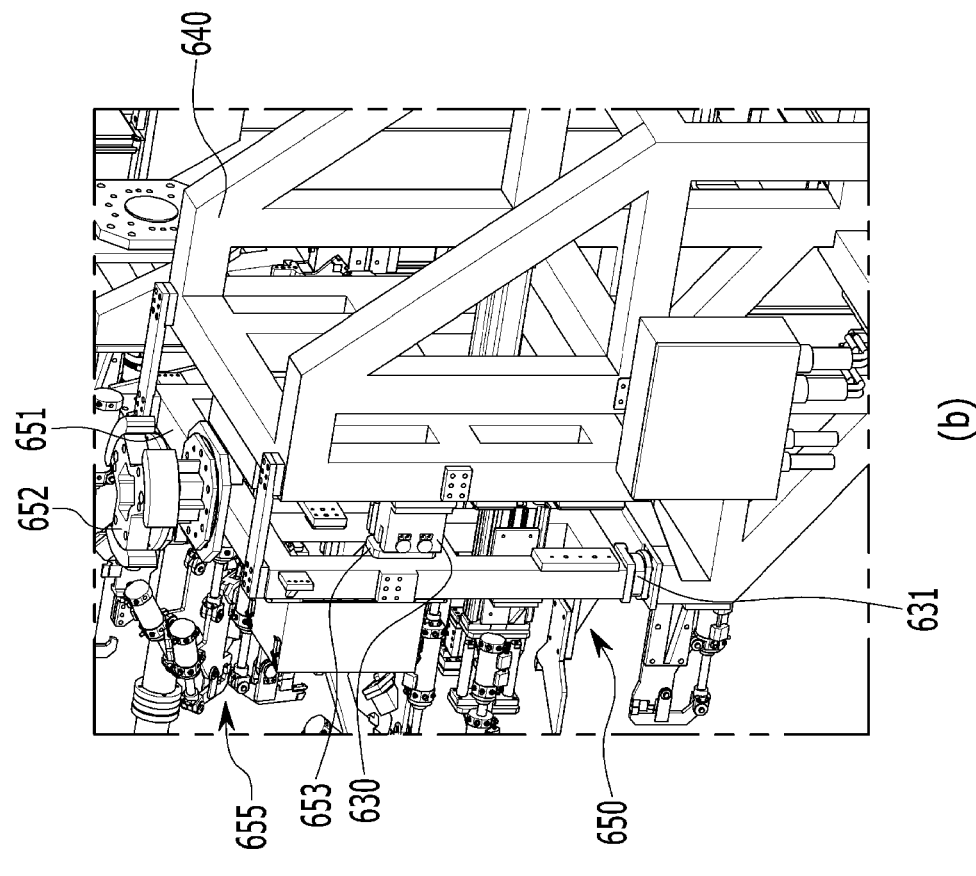
FIG. 12 is a diagram illustrating a structure of mounting a side gate of a quarter portion of a main-buck unit applied to a vehicle body assembly system according to an exemplary embodiment of the present disclosure.
Figure 12:
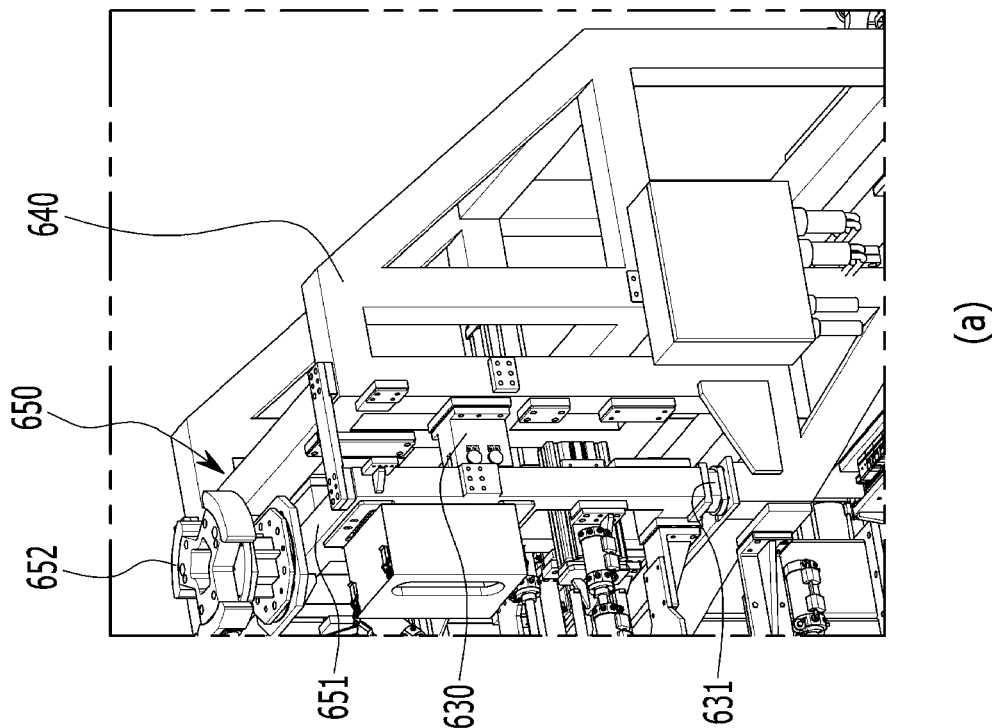

In an exemplary embodiment of the present disclosure, the quarter portion side gate 650 regulates the quarter portion 4e of the side assembly 3 in the main-buck section 50 and is mounted on the mounting frame 640. As shown in FIG. 12, the quarter portion side gate 650 includes a gate frame 651, a fastening portion 653, and a third clamper 655.

The gate frame 651 is provided so as to be mountable to the arm tip of a handling robot (not shown in the drawing) through the robot coupling portion 652 and is fixedly installed on the mounting frame 640.

The gate frame 651 is coupled to the docking coupling portion 631 provided in the mounting frame 640 through a lower end portion. The fastening portions 653 are provided on both sides of the gate frame 651, respectively, and are mutually fastened with the mounting portions 630 provided in the mounting frame 640.

Here, the lower end of the gate frame 651 is coupled to the docking coupling portion 631 through a coupling means having a protrusion and a groove. The fastening portion 653 is fitted into the mounting portion 630 and fastened to the mounting portion 630 through fastening means such as bolts.

Referring to FIG. 3, in an exemplary embodiment of the present disclosure, in the main-buck section 50, the distance between the side assemblies 3 located on both sides of the floor assembly 2 is measured, and according to the measured value, the second post frame 571 and the mounting frame 640 may be moved to a set position.

To this end, the exemplary embodiment of the present disclosure includes the second sensor 710 installed in the main-buck section 50. The second sensor 710 may include a known technology vision sensor. The second sensor 710 measures the distance between the side assemblies 3 positioned on both sides of the floor assembly 2 and outputs the measured value to a controller (not shown in the drawing).

Referring to FIG. 8 to FIG. 10 with FIG. 3, in an exemplary embodiment of the present disclosure, the second and third position correction units 730 and 750 correct the positions of the second and third moving members 550 and 610 with respect to the main-buck frame 51 in the vehicle width direction according to the measured value of the second sensor 710.

In the above, the second position correction unit 730 is in stopping contact with the main-buck frame 51 and the second moving member 550. In addition, the third position correction unit 750 is installed to the main-buck frame 51 and the third movable member 610 so as to be in stopping contact with each other.

The second and third position correction units 730 and 750 are, as shown in FIG. 7 previously disclosed, the second and third fixed stoppers 731 and 751 and the second and third movable stoppers 741 and 761, respectively.

The second and third fixing stoppers 731 and 751 are fixed to the second and third moving members 550 and 610, respectively. Each of the second and third fixing stoppers 731 and 751 is provided in a plate shape. The second and third fixed stoppers 731 and 751 form third and fourth inclined surfaces 733 and 753 inclined toward one side with respect to the vehicle body conveying direction, respectively.

The second and third movable stoppers 741 and 761 are installed on the main-buck frame 51 so as to reciprocate forward and backward along the vehicle body transport direction in correspondence with the second and third fixed stoppers 731 and 751, respectively. The second and third movable stoppers 741 and 761 have a plate shape and are provided to be in surface contact with the second and third fixed stoppers 731 and 751, respectively.

The second and third movable stoppers 741 and 761 are inclined on the other side based on the vehicle body conveying direction, and the third and fourth inclined surfaces 733 and 753 of the second and third fixed stoppers 731 and 751 and the fifth and sixth inclined surfaces 743 and 763 capable of surface contact are formed, respectively.

In the above, the second and third movable stoppers 741 and 761 move back and forth along the vehicle body transport direction by the fifth and sixth driving sources 745 and 765, respectively. The fifth and sixth driving sources 745 and 765 include second and third linear modules 747 and 767 installed on the main buck frame 51, respectively.

The second and third linear modules 747 and 767 includes linear motors 751 and 771, and movement blocks 755 and 775 linearly reciprocating along the vehicle body transport direction through the linear guides 753 and 773 by driving the linear motors 751 and 771, respectively. Here, the second and third movable stoppers 741 and 761 are fixedly installed on the moving blocks 755 and 775, respectively.

Meanwhile, referring again to FIG. 1 and FIG. 2, the main-buck unit 500 according to the embodiment of the present disclosure as described above includes the second welding robots 12 and second and third storage units 820 and 830 as mentioned above.

The second welding robots 12 are installed in the main-buck section 50, can weld the roof portion 4d and the cowl 7 of the side assembly 3, the front roof rail 8a, the rear roof rail 8b, and the package tray 9, and weld the quarter portion 4e of the side assembly 3 and the floor assembly 2.

The second storage unit 820 is installed in the main-buck section 50 and may store different main-buck side jigs 510 for each vehicle type. The main-buck side jigs 510 stored in the second storage unit 820 may be withdrawn by the second handling robot 102.

In addition, the third storage unit 830 is installed in the main-buck section 50 and may store side gates 650 of the quarter unit that are different for each vehicle type. The quarter portion side gates 650 stored in the third storage unit 830 may be withdrawn by a handling robot not shown in the drawing.

Hereinafter, the operation of the vehicle body assembly system 100 according to an exemplary embodiment of the present disclosure configured as described above and the assembly process of the vehicle body using the vehicle body assembly system 100 will be described in detail with reference to the previously disclosed drawings.

First, in an exemplary embodiment of the present disclosure, the floor assembly 2 assembled in the sub-assembly line is transferred to the pre-buck section 20 along the transfer path set through the carriage line 1.

In this process, the first moving members 150 on both sides of the transport path in the pre-buck section 20 is in a state of being moved backward in a direction away from each other (a vehicle width direction) together with the first guide post 170 by the driving of the first driving source 151. Further, in the pre-buck section 20, the first handling robot 101 is equipped with a pre-buck side jig 110 of a vehicle type set at the tip of the arm thereof.

In this state, in an embodiment of the present disclosure, in a state in which the side assembly 3 is aligned through a separate alignment jig, the pre-buck side jig 110 is moved to the side assembly 3 through the first handling robot 101. Then, in an exemplary embodiment of the present disclosure, the seal side 4a and the front and rear sides 4b and 4c of the side assembly 3 are regulated through the pre-buck side jig 110.

Here, the pre-buck side jig 110 clamps the seal side 4a and the front and rear sides 4b and 4c of the side assembly 3 different for each vehicle type through the first clampers 113.

In the above process, in an exemplary embodiment of the present disclosure, the width of the floor assembly 2 along the vehicle width direction is measured through the first sensor 210, and the measured value is output to a controller (not shown).

Then, the controller compares the measured value of the first sensor 210 with a preset reference value, calculates a position correction value according to the difference between the measured value and the reference value, and applies a control signal according to the position correction value to the second driving source 245 of the first position correction unit 230.

Accordingly, the first linear module 247 of the second driving source 245 linearly reciprocates the moving block 255 along the vehicle body transport direction through the linear guide 253 by driving the linear motor 251, and moves the first movable stopper 241 forward or backward along the vehicle body transport direction to a position corresponding to the position correction value.

Then, in an exemplary embodiment of the present disclosure, the first moving member 150 is moved forward by the forward operation of the first operating cylinder 153 of the first driving source 151. Here, the first moving member 150 advances until the first gradient surface 233 of the first fixed stopper 231 stops contacting the second gradient surface 243 of the first movable stopper 241. Accordingly, in an exemplary embodiment of the present disclosure, the first guide post 170 may be positioned at a set position by the first moving member 150.

Next, in an exemplary embodiment of the present disclosure, the pre-buck side jig 110 clamping the seal side 4a of the side assembly 3 and the front and rear sides 4b and 4c is moved toward the first guide post 170 through the first handling robot 101.

After this, in an exemplary embodiment of the present disclosure, the first post coupling portion 121 of the pre-buck side jig 110 is coupled to the first jig coupling portion 173 of the first guide post 170 by the first handling robot 101.

Here, the first coupling block 123 of the first post coupling portion 121 is coupled to the first coupling housing 175 of the first jig coupling portion 173 through a first guide roller 127. In an exemplary embodiment of the present disclosure, the first coupling pin 125 of the first coupling block 123 is coupled to the first pin coupling hole 179 of the first coupling housing 175, and the first coupling block 123 is coupled to the first coupling housing 175.

In such a state, in an exemplary embodiment of the present disclosure, the first coupling block 123 is clamped by the clamping operation of the first jig clamp 177 of the first jig coupling portion 173, and the first post coupling portion 121 of the pre-buck side jig 110 is fixed to the first jig coupling portion 173.

Therefore, in an exemplary embodiment of the present disclosure, in the pre-buck section 20, the lower seal side 4a of the side assembly 3 and the front and rear sides 4b and 4c are regulated through the pre-buck side jig 110, and the side assembly 3 can be accurately matched to the set positions on both sides of the floor assembly 2. Furthermore, in an exemplary embodiment of the present disclosure, the distribution of the position (assembly) of the side assembly 3 may be minimized through the first position correction unit 230 described above.

Next, in an exemplary embodiment of the present disclosure, the lower seal side 4a and the front and rear sides 4b and 4c of the side assembly 3 are welded to both sides of the floor assembly 2 through the first welding robot 11.

When welding as above is completed, in an exemplary embodiment of the present disclosure, in the pre-buck section 20, the body assembled with side assemblies 3 on both sides of the floor assembly 2 is transferred to the main-buck section 50 along the transfer path of the carriage line 1.

In this process, in the main-buck section 50, the second moving members 550 on both sides of the transport path are in a state of being moved backwards along with the second guide post 570 in a direction away from each other (the vehicle width direction) by driving of the third driving source 551.

In addition, the third moving members 610 on both sides of the transfer path are in a state of being moved backward in a direction away from each other (the vehicle width direction) together with the mounting frame 640 by driving of the fourth driving source 611.

Here, the second handling robot 102 is equipped with a main-buck side jig 510 of a vehicle type set at the tip of the arm. In addition, a quarter portion side gate 650 of a set vehicle type is mounted on the mounting frame 640 on the third moving member 610.

Also, in the above process, the cowl 7, the front roof rail 8a, the rear roof rail 8b, and the package tray 9 as a CRP part regulated by the CRP carriage 10 are moved to the roof portion 4d of the side assembly 3.

In this state, in an exemplary embodiment of the present disclosure, the distance between the side assemblies 3 located on both sides of the floor assembly 2 is measured through the second sensor 710, and the measured value is output to a controller (not shown in the drawing).

Then, the controller compares the measured value of the second sensor 710 with a preset reference value, calculates a position correction value according to the difference between the measured value and the reference value, and applies a control signal according to the position correction value to the fifth driving source 745 of the second position correction unit 730 and the sixth driving source 765 of the third position correction unit 750.

Accordingly, the second linear module 747 of the fifth driving source 745 linearly reciprocates the moving block 755 through the linear guide 753 by driving the linear motor 751 along the vehicle body transport direction, and moves the second movable stopper 741 forward or backward along the vehicle body transport direction to a position corresponding to the position correction value.

At the same time, the third linear module 767 of the sixth driving source 765 linearly reciprocates the moving block 775 along the vehicle body transport direction through the linear guide 773 by driving the linear motor 771, and moves the third movable stopper 761 forward or backward along the vehicle body transport direction to a position corresponding to the position correction value.

Then, in an exemplary embodiment of the present disclosure, the second moving member 550 is moved forward by the forward operation of the second operating cylinder 553 of the third driving source 551. Here, the second moving member 550 moves forward until the third inclined surface 733 of the second fixed stopper 731 makes stop contact with the fourth inclined surface 753 of the second movable stopper 741. Accordingly, in an exemplary embodiment of the present disclosure, the second guide post 570 may be positioned at a set position by the second moving member 550.

At the same time, in an exemplary embodiment of the present disclosure, the third moving member 610 is moved forward by the forward operation of the third operating cylinder 613 of the fourth driving source 611. Here, the third moving member 610 moves forward until the fifth inclined surface 743 of the third fixed stopper 751 makes stop contact with the sixth inclined surface 763 of the third movable stopper 761. Accordingly, in an exemplary embodiment of the present disclosure, the quarter portion side gate 650 together with the mounting frame 640 may be positioned at a set position by the third moving member 610.

Next, in an exemplary embodiment of the present disclosure, the main-buck side jig 510 is moved toward the second guide post 570 through the second handling robot 102. After this, in an exemplary embodiment of the present disclosure, the second post coupling portion 521 of the main-buck side jig 510 is coupled to the second jig coupling portion 573 of the second guide post 570 by the second handling robot 102.

Here, the second coupling block 523 of the second post coupling portion 521 is coupled to the second coupling housing 575 of the second jig coupling portion 573 through the second guide roller 527. In an exemplary embodiment of the present disclosure, the second coupling pin 525 of the second coupling block 523 is coupled to the second pin coupling hole 579 of the second coupling housing 575, and the second coupling block 523 is a second coupling housing 575.

In such a state, in an exemplary embodiment of the present disclosure, the second coupling block 523 is clamped by the clamping operation of the second jig clamp 577 of the second jig coupling portion 573, and the second post coupling portion 521 of the main-buck side jig 510 is fixed to the second jig coupling portion 573.

In this process, in an exemplary embodiment of the present disclosure, the first coupling rod 531 of the main-buck side jig 510 on one side of the transport path and the second coupling rod 532 of the main-buck side jig 510 on the other side of the transport path are mutually coupled, and the absolute width (width in the vehicle width direction) between both side assemblies 3 can be maintained.

Then, in an exemplary embodiment of the present disclosure, both side roof portions 4d of the side assembly 3 are regulated through the second clampers 513 of the main-buck side jig 510, and the quarter portion 4e of the side assembly 3 is regulated through the third clampers 655 of the quarter portion side gate 650.

Therefore, in an exemplary embodiment of the present disclosure, the cowl 7, the front roof rail 8a, the rear roof rail 8b, and the package tray 9 as the CRP components regulated in the CRP carriage 10 can be exactly matched to the roof portion 4d of the side assembly 3. Furthermore, in an exemplary embodiment of the present disclosure, the distribution of the position (assembly) of the side assembly 3 may be minimized through the second and third position correction units 730 and 750.

Next, in an exemplary embodiment of the present disclosure, through the second welding robot 12, the roof portion 4d and the cowl 7 of the side assembly 3, the front roof rail 8a, the rear roof rail 8b, and the package tray 9 are welded, and the quarter portion 4e of the side assembly 3 and the floor assembly 2 are welded.

According to the vehicle body assembly system 100 according to an exemplary embodiment of the present disclosure as described so far, unlike the conventional technology that forms the skeleton of the vehicle body in a single process, by separating the vehicle body assembly process into two processes, it is possible to assemble the vehicle body of multiple vehicle types, and it is possible to commonize multiple vehicle models using a robot.

Therefore, in an exemplary embodiment of the present disclosure, flexible production of multiple vehicle types is possible, equipment preparation time can be reduced, weight reduction and simplification of the entire equipment can be achieved, and investment costs in the initial stage and when adding vehicle types can be reduced.

Furthermore, in an exemplary embodiment of the present disclosure, by minimizing the position distribution of the side assembly 3 through the first, second, and third position correction units 230, 730, 750, deterioration of the quality of the vehicle body assembly due to the distribution of the position of the side assembly 3 can be prevented.

Furthermore, in an exemplary embodiment of the present disclosure, the first, second, and third moving members 150, 550 and 610 are moved by a simple configuration such as an operating cylinder without using a servo motor, and the side assembly 3 can be assembled on both sides of the floor assembly 2. Therefore, it is possible to reduce the weight of the facility and reduce the initial investment cost.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

The invention claimed is:

1. A vehicle body assembly system having a pre-buck section and a main-buck section sequentially set along a transport path of a floor assembly through a carriage line, comprising:
    a plurality of first welding robots positioned on first and second sides of the transport path of the carriage line in the pre-buck section;
    a plurality of second welding robots positioned on the first and second sides of the transport path of the carriage line in the main-buck section;
    a pre-buck unit positioned in the pre-buck section, the pre-buck unit being configured to regulate a seal side, a front side, and a rear side of a side assembly, and to assemble the side assembly to the floor assembly through the plurality of first welding robots positioned on the first and second sides of the transport path of the carriage line in the pre-buck section; and
    a main-buck unit positioned in the main-buck section, the main-buck unit being configured to regulate a roof portion and a quarter portion of the side assembly assembled to the floor assembly in the pre-buck section, to assemble the roof portion, a cowl, a roof rail, and a package tray, and to assemble the quarter portion and the floor assembly through a plurality of second welding robots positioned on the first and second sides of the transport path of the carriage line in the main-buck section;
    wherein the pre-buck section and the main-buck section are formed as separate regions spaced apart from each other.

2. The vehicle body assembly system of claim 1, wherein:
    the pre-buck unit includes:
    a pre-buck side jig mounted on a distal end of an arm of a handling robot, the pre-buck side jig being configured to regulate the seal side and the front and rear sides of the side assembly; and
    a first guide post configured to be reciprocally moved in a vehicle width direction on a pre-buck frame on one side of the transfer path, and to be coupled to the pre-buck side jig through the handling robot.

3. The vehicle body assembly system of claim 2, wherein:
    the main-buck unit includes:
    a main-buck side jig mounted on a front end of the arm of the handling robot and configured to regulate the roof portion of the side assembly;
    a second guide post installed in a main-buck frame on the one side of the transfer path, and configured to be reciprocally moved along the vehicle width direction, and coupled to the main-buck side jig through the handling robot; and
    a quarter portion side gate mounted on a mounting frame, the quarter portion side gate configured to be reciprocally movable along the vehicle width direction in the main-buck frame separately from the second guide post, and configured to regulate the quarter portion of the side assembly.

4. The vehicle body assembly system of claim 2, wherein:
    in the pre-buck section, a width of the floor assembly along the vehicle width direction is measured, and the first guide post is capable of being moved to a set position according to the measured width.

5. The vehicle body assembly system of claim 3, wherein:
in the main-buck section, a distance between the side assemblies positioned on both sides of the floor assembly is measured, and the second guide post and the mounting frame are capable of being moved to a set position according to the measured width.

* * * * *